United States Patent
Baumgartner et al.

(10) Patent No.: US 7,396,555 B2
(45) Date of Patent: Jul. 8, 2008

(54) METHOD FOR MAKING A LOW CARBOHYDRATE DOUGH

(75) Inventors: Theodore James Baumgartner, Fairview, TX (US); Richard Todd Smith, McKinney, TX (US)

(73) Assignee: Frito-Lay North America, Inc., Plano, TX (US)

( * ) Notice: Subject to any disclaimer, the term of this patent is extended or adjusted under 35 U.S.C. 154(b) by 460 days.

(21) Appl. No.: 10/887,399

(22) Filed: Jul. 8, 2004

(65) Prior Publication Data

US 2006/0008563 A1    Jan. 12, 2006

(51) Int. Cl.
*A23L 1/20* (2006.01)

(52) U.S. Cl. .................. 426/634; 426/446; 426/459; 426/460; 426/461; 426/464; 426/507; 426/508; 426/509; 426/516; 426/517; 426/518

(58) Field of Classification Search ................. 426/634, 426/446, 459, 460, 461, 464, 507, 508, 509, 426/516, 517, 518
See application file for complete search history.

(56) References Cited

U.S. PATENT DOCUMENTS

| | | | |
|---|---|---|---|
| 3,849,582 A | | 11/1974 | Blagdon et al. |
| 3,911,142 A | | 10/1975 | Huelskamp et al. |
| 3,919,434 A | | 11/1975 | Tsen et al. |
| 4,041,187 A | * | 8/1977 | Nelson et al. ............... 426/598 |
| 4,084,016 A | | 4/1978 | Kon et al. |
| 4,088,795 A | * | 5/1978 | Goodnight et al. .......... 426/598 |
| 4,120,988 A | | 10/1978 | Hahn |
| 4,124,727 A | | 11/1978 | Rockland et al. |
| 4,140,803 A | | 2/1979 | Panchuk et al. |
| 4,478,857 A | | 10/1984 | Stauss |
| 4,505,942 A | * | 3/1985 | Ito et al. ..................... 426/551 |
| 4,744,524 A | * | 5/1988 | Gupta et al. .................. 241/36 |
| 4,770,891 A | | 9/1988 | Willard |
| 4,915,967 A | * | 4/1990 | Nozaka ...................... 426/489 |
| 5,026,568 A | | 6/1991 | Takemori et al. |
| 5,051,270 A | | 9/1991 | Ueda et al. |

(Continued)

FOREIGN PATENT DOCUMENTS

JP    62111640    5/1987

(Continued)

OTHER PUBLICATIONS

About Website. Dolson. Beans and Other Legumes. Published Mar. 2007. http://lowcarbdiets.about.com/od/southbeachdiet/a/beanslegumes.htm.*

(Continued)

*Primary Examiner*—Anthony Weier
(74) *Attorney, Agent, or Firm*—Chad E. Walter; Colin P. Cahoon; Carstens & Cahoon, LLP

(57) ABSTRACT

A method for making a low or reduced carbohydrate dough for making snack food products with a reduced carbohydrate content. Legumes such as soybeans are cooked near boiling, drained, and milled. Dry ingredients such as starch, fiber, and/or protein can be added to lower the dough moisture content so the dough can be sheeted and cut into pre-forms. The pre-forms can then be cooked, by frying or baking, and seasoned to make a low carbohydrate tortilla-like snack food.

13 Claims, 1 Drawing Sheet

U.S. PATENT DOCUMENTS

| | | |
|---|---|---|
| 5,132,127 A | 7/1992 | Wisdom |
| 5,362,511 A | 11/1994 | Villagran et al. |
| 5,553,532 A | 9/1996 | de la Luz-Martinez |
| 5,567,459 A | 10/1996 | Gonzalez-Hernandez |
| 5,591,471 A | 1/1997 | Niwano et al. |
| 5,738,896 A | 4/1998 | Cassetta et al. |
| 5,855,949 A | 1/1999 | McLean |
| 5,871,801 A * | 2/1999 | Kazemzadeh ............... 426/634 |
| 5,925,396 A | 7/1999 | Reed et al. |
| 5,928,700 A | 7/1999 | Zimmerman et al. |
| 6,001,409 A | 12/1999 | Gimmler et al. |
| 6,291,009 B1 | 9/2001 | Cohen |
| 6,391,374 B1 | 5/2002 | Gray et al. |
| 6,479,089 B2 | 11/2002 | Cohen |
| 6,579,560 B2 | 6/2003 | Kagawa et al. |
| 6,589,584 B1 | 7/2003 | Stark |
| 6,607,772 B1 | 8/2003 | Bortone |
| 6,720,022 B1 | 4/2004 | Arnaut et al. |
| 6,733,815 B2 * | 5/2004 | Gilbertson et al. .......... 426/622 |
| 7,029,716 B2 * | 4/2006 | Margolis .................... 426/459 |
| 2001/0019734 A1 | 9/2001 | Gilbertson et al. |
| 2001/0055642 A1 | 12/2001 | Cohen |
| 2002/0160081 A1 | 10/2002 | Tiano et al. |
| 2003/0008061 A1 | 1/2003 | Gray et al. |
| 2003/0064145 A1 | 4/2003 | Fannon |
| 2003/0091698 A1 | 5/2003 | Marsland |
| 2003/0108654 A1 | 6/2003 | Blaun |
| 2004/0071826 A1 | 4/2004 | Rapp et al. |
| 2004/0071852 A1 | 4/2004 | Vodovotz et al. |
| 2004/0076719 A1 | 4/2004 | Pimentel |

FOREIGN PATENT DOCUMENTS

| | | |
|---|---|---|
| WO | WO 03/009697 | 2/2003 |
| WO | WO 03/079815 | 10/2003 |
| WO | WO 03/105603 | 12/2003 |
| WO | WO 2004/030465 | 4/2004 |

OTHER PUBLICATIONS

J.Y. Faller, B.P. Klein, J.F. Faller, Acceptability of Extruded Corn Snacks as Affected by Inclusion of Soy Protein, Journal of Food Science, vol. 64, No. 1, 1999, pp. 185-188, University of Illinois, Urban, IL.

A.A. Adesina, C.M. Sowbhagya, S. Bhattacharya and S. Zakiuddin Ali, Maize-soy-base Ready-to-eat Extruded Snack Food, J. Food Sci. Technol., 1998, vol. 35, No. 1 pp. 40-43, Central Food Technology Research Institute, India.

Leslie Skarra, Barriers to Soy applications in food products, Food Ingredients and Analysis International, 1999, pp. 16, 18, 20, Merlin Development, Plymouth, MN.

Fu-Hung Hsieh, Recent Advances in Food-Feed Extrusion, Presented for the American Soybean Association in China, Aug. 25-Sep. 11, 2002, pp. 1-18, American Soybean Association, University of Missouri, Columbia, MO.

M.N. Riaz, Healthy Baking with Soy Ingredients, Cereal Food World, 1999, vol. 44(3):136, pp. 1-6, Food Protein Research and Development Center, College Station, TX, USA.

Ming Tsao Chen, Utilization of Soy Protein in Asian Vegetarian Products and Snack Food Development, found at website: www.soyasa.org, Feb. 2004, pp. 1-14, American Soybean Association, National Chung-Hsing University, Taiwan, R.O.C.

E.A. Abd El-Hady, R.A. Habiba, Effect of Soaking and Extrusion Conditions on Antinutrients and Protein Digestibilty of Legume Seeds, Swiss Society of Food Science and Technology, 2003, pp. 285-293, U-Technol, 36, Elsevier Science Ltd., Egypt.

* cited by examiner

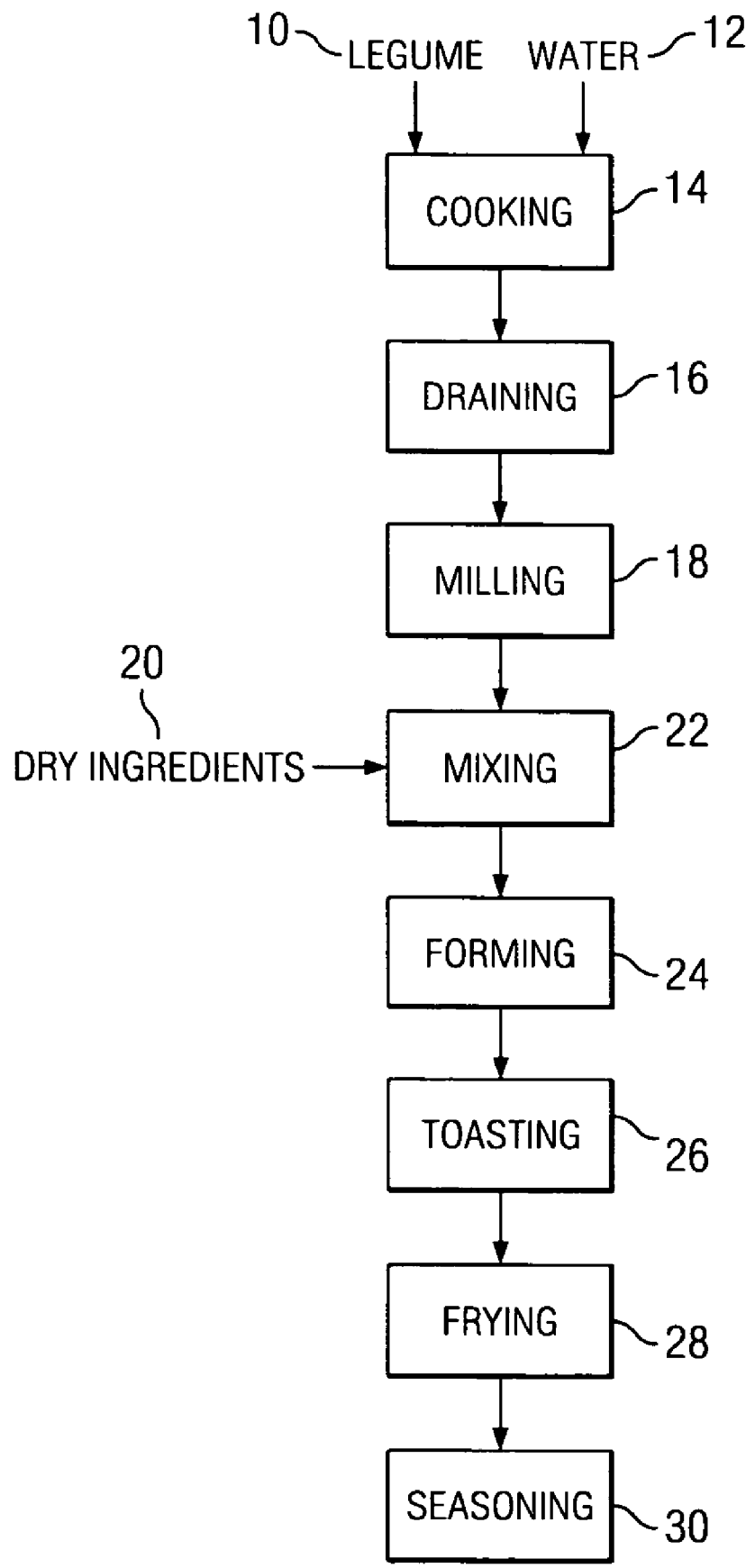

METHOD FOR MAKING A LOW CARBOHYDRATE DOUGH

BACKGROUND OF THE INVENTION

1. Technical Field

The present invention relates to the production of a low carbohydrate sheetable dough that can be made into a shelf stable snack food with minimal reduction of organoleptical properties.

2. Description of Related Art

Shelf stable snack food products such as tortilla chips are popular consumer items for which there exists a great demand. Tortilla chips are typically made from corn. The corn from corn tortilla chips such as those in the snack food industry is sometimes cooked and soaked prior to being made into a flour, dough, or masa. One example of this process is the treatment of corn in nixtamalization process—the traditional method for processing fresh corn to form masa dough. This process dates back to the pre-Columbian era of the Aztec and Maya people in Mesoamerica. In the traditional nixtamalization process, fresh whole-kernel corn is first soaked in absolution of water and lime (calcium hydroxide) and then partially cooked at or near the boiling point for a short time depending on the hardness of the corn. The corn is then steeped in the limewater solution and is allowed to cool for about 8-18 hours in order to loosen and degrade the pericarp (or bran), which is the outer, fibrous layer of a corn kernel. Cooking and steeping in alkaline solution causes partial dissolution of the cuticle and other pericarp layers as well as swelling and weakening of cell walls and fiber components. The corn kernels are then drained of the cooking liquor (called "nejayote"), which contains loosened pericarp and other dissolved or suspended particles, and the corn kernels are washed to remove excess lime and loose particles. Typically, up to 15% by weight of the total corn fraction is lost during the cooking and washing steps. The corn kernels are then ground to disrupt the starch-containing cell structures and cause the mixture to gelatinize. The ground, wet mixture can be mixed with water to form fresh masa dough, or it can be dehydrated to form dry masa flour. Dry masa flour can be rehydrated at a later time to form masa dough. Unfortunately, corn is a high carbohydrate food. The carbohydrate calories present in a traditional tortilla chip are derived primarily form the corn content.

Recently, consumer demand for products low in carbohydrates has dramatically increased, as the popularity of low carbohydrate diets has increased. According to one recent newspaper account, 40% of consumers say they are watching their carbohydrate intake. There are currently numerous low carbohydrate diets being marketed to consumers. Such an example is exemplified by U.S. Pat. No. 5,855,949, which discloses a dietary system for the treatment of obesity that prescribes foods that are low in fats and carbohydrates, and which have moderate amounts of proteins. Unfortunately, the '949 patent fails to disclose a means for reducing carbohydrate intake from snack foods. U.S. Patent Application 2003/0108654 A1 discloses a dry mix and process for using said mix to make a low carbohydrate potato product. Dry mixes are not usually considered "ready to eat" foods, as water must first be added and the resulting dough composition mixed and cooked prior to consumption. In addition, the application indicates that the product made from the dry mix are not shelf stable unless dried. If the products are dried, though, they may not be ready to eat. Thus, the invention disclosed in the '654 application fails to provide a convenient, ready to eat, shelf-stable, and low carbohydrate snack food. Hence, there is a need for a convenient low carbohydrate shelf-stable, ready to eat snack food.

Many convenient, shelf-stable, ready to eat snack foods are high in carbohydrates. This reality makes it difficult for consumers to maintain a low carbohydrate diet. In addition, many consumers have become accustomed to supplementing their meals with convenient snack foods, adding more difficulty to maintaining a low carbohydrate diet.

One solution for a low carbohydrate snack food is illustrated in U.S. Patent Application No. 2003/0064145 A1, entitled "Puffed Protein Based Snack Food." The '145 patent application discloses a low-density snack food comprising a solids matrix of protein, an optional carbohydrate filler in a fat content not to exceed 30%. The taste and texture characteristics of this product, however, fail to mimic the taste and texture characteristics of a conventionally produced puffed snack product. For example, there is no discussion in the disclosure how the off flavors known to inherently develop in extruded high protein compounds, were avoided. This disclosure however, is directed towards direct expanded food products rather than tortilla-like snack products.

Another attempt to solve this problem is disclosed in U.S. Pat. Nos. 6,291,009 and 6,479,089, which disclose a soy based dough and products made from the dough. These patents, however, use either derivatives of roasted or toasted soybeans such as full fat soy flour or other soy flour, or soy protein concentrates or isolates. Further, soy protein concentrate and soy protein isolates do not break down during mastication forcing the consumer to continue to feel the need to chew for a longer period of time. Thus, it is desirable to minimize use of soy protein isolates and soy protein concentrates as ingredients, however, because of poor mouth feel and texture attributes. Further, soy protein concentrates and soy protein are relatively expensive compared to unprocessed raw ingredients. For example, soy protein isolates and soy protein concentrates can cost ten times or more the cost of raw soybeans. Moreover, full fat soy flour and other soy flours are typically produced from whole soybeans that have been heat treated (e.g. toasted and roasted) to deactivate enzymes and trypsin inhibitors, and then milled. As a result, full fat soy flour and other soy flours usage at high levels similarly produce products with poor mouth feel, texture and flavor attributes.

Consequently, there is a need in the art for a process for manufacturing reduced carbohydrate snack product with taste and texture characteristics similar to conventionally produced snack products. Further, there is a need in the art for a process for manufacturing reduced carbohydrate tortilla-like snack product with taste and texture characteristics similar to conventionally produced corn tortilla snack products. The low carbohydrate snack food should emulate the organoleptical properties, including taste and texture, of a conventionally produced corn tortilla snack product. The snack food should be shelf stable and ready to eat.

SUMMARY OF THE INVENTION

The proposed invention provides a low carbohydrate snack food dough and method for making. In one embodiment, the invention cooks raw soybeans in a solution, drains the solution, mills the cooked soybeans, and admixes dry ingredients. The admix of dry ingredients can comprise starch, proteins, or fiber, and mixtures thereof. The dough can be sheeted and dehydrated in an oven or a fryer to make a reduced carbohydrate snack chip. The snack chip can be seasoned.

Hence, this invention produces a convenient, low carbohydrate snack food dough and method for making whereby a low carbohydrate snack food is made that mimics the taste and texture characteristics of conventional, high carbohydrate corn tortilla snack products. In addition, the low carbohydrate snack food is shelf stable and ready to eat. The above as well as additional features and advantages of the present invention will become apparent in the following written description.

DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a flow chart diagram of one embodiment of the new process of the present invention.

DETAILED DESCRIPTION

An embodiment of the innovative invention will now be discussed with reference to FIG. 1. First, a legume 10 is added to a water-based solution 12 for cooking. For example, about 100 to about 300 pounds of soybeans, and about 75 to about 100 gallons of water-based solution are placed into a steam-jacketed kettle. As used herein, a water-based solution comprises primarily water, but may also comprise other additives including, but not limited to, calcium hydroxide and sodium bicarbonate. Although soybeans are used in one embodiment of this invention, other legumes can be used including, but not limited to, pinto beans, garbanzo beans, or any dry bean that can be cooked, milled, and sheeted. The soybeans used are preferably Tofu soybeans. Tofu soybeans have been bred to have a lower beany flavor, a higher protein content, and lower carbohydrate content than traditional soybeans. A Vinton 81 or Asgrow 2247, both available from Archer Daniels Midland of Decatur, Ill., can be used. These soybeans typically have a protein content of between about 37% to about 40%, an oil content of between about 17.5% to about 20%, a carbohydrate content of 26% to about 30% with dietary fiber accounting for 20% of the carbohydrates. Moisture and ash make up the balance. The legume-solution mixture can then be heated to its cook temperature in, for example, a steam-jacketed kettle, to near boiling. In addition, sodium bicarbonate can be added to help reduce the beany flavor.

In one embodiment, the soybeans can be cooked in a limewater solution. However, it should be noted that limewater can attack the soybean hull, causing separation much like the separation of the outer, fibrous layer of the corn kernel that occurs in the traditional nixtamalization process discussed above. Because the soybean hull contains dietary fiber, it can be desirable for the soybean hull to remain because dietary fiber does not digest, and is not considered a "net carbohydrate" by many low carbohydrate dieters. As used herein a "net carbohydrate" is defined as a digestible carbohydrate (total carbohydrates minus carbohydrates from dietary fiber and non-digestable sugars).

Once the target temperature is reached, the soybean 10 and water 12 mixture is cooked 14 at the cook temperature for between about 6 and about 15 minutes. Following the cook 14, about 50 to about 100 gallons of chilled water is added to the kettle to cool the batch approximately about 60-80° F. In a prior art corn nixtamalization process, the kettle of corn-slurry is then pumped to a soak tank to be "steeped" or soaked. This step is preferably avoided here because of the legume's potential to lose the hull (containing desirable dietary fiber) and absorb additional water. After cooling-the batch, the mixture can be routed to a hopper and drained 16. The hopper separates the cooked legume and excess water. The legume-slurry can be gravity fed via a hydrosieve into a washer. The washer is a rotating drum that utilizes a fresh wash water stream to gently rinse the legume. From the washer, the legume is sent by a drain belt that drains excess water. The cooked legume can then be milled to make a milled legume in a standard hammer mill having a 0.020-inch gap or a cutter such as a Comitrol Urschel Model # 3B-010030. As used herein, a milled legume is defined as a legume that has been cooked and milled.

In one embodiment, the milled 18 legume is then admixed 22 with dry ingredients 20. The dry ingredients can comprise starch, fiber, protein, wholegrains, seeds, vegetables, fruits, and mixtures thereof. The starch can be selected from the group consisting of modified starches, pre-gelatinized starches, native starches, pre-gelatinized modified starches, and mixtures thereof. In one embodiment, a pre-gelatinized modified tapioca starch is used. The fiber can be selected from the group consisting of oat fiber, bamboo fiber, potato fiber, corn bran, rice bran, wheat bran, resistant starches, inulin, and mixtures thereof. The protein can be selected from the group consisting of soy flour, soy meal, soy grits, soy chips, soy protein isolate, soy protein concentrate, whey proteins, milk proteins, and mixtures thereof. The wholegrains include, but are not limited to, wheat berry, whole wheat, barley, and oats. The seeds can include, but are not limited to, sesame seeds, poppy seeds and flaxseed. An example of a vegetable that can be used is dehydrated broccoli. An example of a fruit that can be used is a dried cranberry.

The dry ingredients can comprise from between about 5% to about 40% by weight, and more preferably between about 10% to about 25% of the resultant dough mixture by weight. Thus, in one embodiment, the low carbohydrate dough comprises between about 60% to about 95% of a milled legume. One benefit of the dry ingredients is that it lowers the moisture content of the resultant dough. For example, the moisture content of the milled soybeans is about 55% to about 65% water. The moisture content of the dough after admixing the dry ingredients is about 40% to about 50% for a sheeted dough that can be fried and about 20% to about 50% for a sheeted dough that can be baked. Doughs with moisture contents above about 55% by weight can be difficult to sheet. Doughs with lower moisture contents may require a sheeter capable of imparting more force at the sheeter rolls than a traditional sheeter used for a baked or fried snack food. The dry ingredients also help to provide a cohesive dough and soy-masking agents can be used to help reduce the beany soy flavor.

In an alternative embodiment, a reduced carbohydrate dough is made. A reduced carbohydrate dough is made by admixing a milled legume made from the process discussed above, corn masa, and dry ingredients. In one embodiment, the reduced carbohydrate dough comprises between about 20% to about 50% of a milled legume, about 20% to about 50% corn masa, about 10% to about 35% dry ingredients. In one embodiment, the reduced carbohydrate dough comprises between about 35% to about 40% of a milled soybean, about 25% to about 35% corn masa, about 15% to about 20% soy protein isolate, and about 5% to about 15% starch.

In addition to dry ingredients, an oil, including but not limited to, corn oil or cottonseed oil can be added to help provide a cohesive dough. In one embodiment, the reduced carbohydrate dough or the low carbohydrate dough comprises an oil between about 0% to about 15% by weight.

The reduced carbohydrate dough or low carbohydrate dough can then be formed 24 as any other snack food dough is processed in the art to make a cooked snack product. For example, the dough can be extruded or sheeted and cut into snack food pre-forms. The pre-forms can be toasted 26 in a three-pass toast oven at between about 400° F. and about 750° F. for about 30 seconds to achieve a moisture content of about 20% to 30% by weight. The toasted chips can then be sent through a proofing stage where chips are exposed to ambient air for about 30 to about 180 seconds to equilibrate moisture throughout the chip. The chip can then be fried 28 in a conventional tortilla chip fryer at about 340° F. to about 360° F. or other temperature until a moisture content of between about 0.8% to about 2.0% and more preferably about 1.0% is achieved. Higher temperatures provide a crispier texture, but temperatures too high can result in undesirable product browning. Lower temperatures may require more time in the toast oven. The fried snack chip can then be seasoned 30 in a seasoning tumbler and then packaged. In an alternative embodiment, after the dough is sheeted and cut into pre-forms, the pre-forms are sent to an oven and are baked at a temperature of about 400° F. to about 550° F. for about 5 minutes to about 10 minutes to a moisture content of about 1.5%. These baked snack pieces can then be seasoned in an amount up to about 15% by weight of the finished product. Seasoning can be adhered by using a spray oil in an amount up to about 5% to 15% by weight of the finished product. In one embodiment, a low fat, low carbohydrate snack food is thus produced. In an alternative embodiment, an oil up to 15% by weight of the dough, such as corn oil, is additionally admixed into the dough prior to baking to aid palatability.

There are a number of advantages provided by the present invention. First, existing food-processing equipment from a traditional corn tortilla chip line, including cook kettles, sheeters, toast ovens, fryers, and seasoning tumblers can be used. Thus, in one embodiment, a food product manufacturer of corn tortilla chips can easily use existing equipment in making this low carbohydrate dough. Moreover, even if equipment needed to be purchased, it would cost less to install equipment for this process than a standard nixtamalization process because no soak tanks are required. Second, this invention provides a means for making a more natural, low carbohydrate snack food by reducing the amount of processed dry ingredients used, such as soy isolate and soy concentrates. Third, cooking the whole soybeans in a water solution helps hydrate the whole soybeans more than a roasting or toasting, and thus delivers superior taste and texture attributes. Fourth, a low carbohydrate or reduced carbohydrate snack food can be made. In one embodiment, a serving size contains only 6 grams of net carbohydrate, compared to a prior art snack having 17 grams of carbohydrate, a reduction of about 65%.

While this invention has been particularly shown and described with reference to a preferred embodiment, it will be understood by those skilled in the art that various changes in form and detail may be made therein without departing from the spirit and scope of the invention.

What is claimed is:

1. A method for making a legume-based dough, said method comprising the sequential steps of:
    a) cooking a raw legume in a water-based solution to make a cooked legume;
    b) draining said solution from said cooked legume;
    c) milling said cooked legume to make a milled legume having a first moisture content;
    d) admixing dry ingredients with said milled legume having said first moisture content to make a dough having a second moisture content, where said second moisture content is lower than said first moisture content, and wherein said dough comprises between about 60% to about 95% of said milled legumes; and
    e) forming and cutting said dough.

2. The method of claim 1, further comprising the step of:
    f) frying said dough in hot oil to make a cooked snack product.

3. The method of claim 1, further comprising the step of:
    f) baking said dough to make a cooked snack product.

4. The method of claim 2 or claim 3 further comprising the step of g) seasoning said cooked snack product.

5. The method of claim 1, wherein said legume at step a) comprises soybeans.

6. The method of claim 1, wherein said solution of step a) comprises sodium bicarbonate.

7. The method of claim 1 further comprising admixing an oil at step d).

8. The method of claim 1, wherein said dry ingredients comprise between about 5% and about 40% by weight and are selected from the group consisting of starch, fiber, protein, whole grains, seeds, vegetables, fruits, and mixtures thereof.

9. The method of claim 8, wherein said dry ingredient comprises starch, wherein said starch is selected from the group consisting of modified starches, pre-gelatinized starches, native starches, pre-gelatinized modified starches, and mixtures thereof.

10. The method of claim 8, wherein said dry ingredient comprises protein, wherein said protein is selected from the group consisting of soy flour, soy meal, soy grits, soy chips, soy protein isolate, soy protein concentrate, whey proteins, milk proteins, and mixtures thereof.

11. The method of claim 8, wherein said dry ingredient comprises fiber, wherein said fiber is selected from the group consisting of oat fiber, bamboo fiber, potato fiber, corn bran, rice bran, wheat bran, resistant starches, inulin, and mixtures thereof.

12. The method of claim 1 wherein the forming at step e) comprises sheeting.

13. The method of claim 1 wherein the forming at step e) comprises extruding.

* * * * *